(12) United States Patent
Chauvet et al.

(10) Patent No.: US 9,471,409 B2
(45) Date of Patent: Oct. 18, 2016

(54) PROCESSING OF PDSE EXTENDED SHARING VIOLATIONS AMONG SYSPLEXES WITH A SHARED DASD

(71) Applicant: International Business Machines Corporation, Armonk, NY (US)

(72) Inventors: Philip R. Chauvet, Tucson, AZ (US);
David C. Reed, Tucson, AZ (US);
Thomas C. Reed, Tucson, AZ (US);
Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 14/604,700

(22) Filed: Jan. 24, 2015

(65) Prior Publication Data
US 2016/0217027 A1 Jul. 28, 2016

(51) Int. Cl.
*G06F 11/00* (2006.01)
*G06F 11/07* (2006.01)
*G06F 3/06* (2006.01)
(Continued)

(52) U.S. Cl.
CPC .......... *G06F 11/0727* (2013.01); *G06F 3/065* (2013.01); *G06F 3/068* (2013.01); *G06F 3/0619* (2013.01); *G06F 3/0655* (2013.01); *G06F 11/0787* (2013.01); *G06F 11/1451* (2013.01); *G06F 11/1662* (2013.01)

(58) Field of Classification Search
CPC .......... G06F 11/0727; G06F 11/0787; G06F 11/1662; G06F 11/2064; G06F 11/2082; G06F 11/2089
See application file for complete search history.

(56) References Cited

U.S. PATENT DOCUMENTS

| 5,398,331 A | * | 3/1995 | Huang | G06F 11/1633 714/12 |
| 5,504,861 A | * | 4/1996 | Crockett | G06F 11/1435 714/13 |
| 5,615,329 A | * | 3/1997 | Kern | G06F 11/2064 714/6.12 |

(Continued)

FOREIGN PATENT DOCUMENTS

EP 0433269 A2 6/1996

OTHER PUBLICATIONS

K.G. Rubsam, "MVS Data Services," IBM Systems Journal, vol. 28, No. 1, 1989, pp. 151-164.

(Continued)

*Primary Examiner* — Charles Ehne
(74) *Attorney, Agent, or Firm* — Eric A. Gifford (57) ABSTRACT

Method, system, and networked embodiments for processing PDSE extended sharing violations are provided. A single special page referred to as a "sync" page is added to the PDSE dataset. The sync page is loaded from DASD to local cache at PDSE dataset open and remains open until the last close of the PDSE dataset. The in-core version of the sync page maintains a list of index update records for all computer systems within a sysplex and the on-DASD version of the sync page maintains a list of index update records for all computer systems connected to shared DASD. By leveraging properties of the sync page, and more particularly by monitoring any divergence in the in-core and on-DASD sync pages, a PDSE error handling module can programmatically determine when a PDSE dataset has been accessed by a rogue system, diagnose the type of error associated with the rogue update, log and notice of all systems in the sysplex of the error (and eventually connected systems outside the sysplex) and, for certain types of errors, fix the PDSE dataset.

20 Claims, 5 Drawing Sheets

(51) Int. Cl.
*G06F 11/14* (2006.01)
*G06F 11/16* (2006.01)

(56) References Cited

U.S. PATENT DOCUMENTS

| | | | |
|---|---|---|---|
| 5,682,513 A * | 10/1997 | Candelaria | G06F 11/2074 711/113 |
| 5,734,818 A * | 3/1998 | Kern | G06F 11/2064 714/20 |
| 5,870,537 A * | 2/1999 | Kern | G06F 11/2064 711/162 |
| 5,960,194 A | 9/1999 | Choy et al. | |
| 6,304,980 B1 * | 10/2001 | Beardsley | G06F 11/2064 707/999.202 |
| 6,324,647 B1 | 11/2001 | Bowman-Amuah | |
| 6,928,554 B2 | 8/2005 | Dettinger et al. | |
| 8,666,947 B2 | 3/2014 | Reed et al. | |
| 8,688,635 B2 | 4/2014 | Reed et al. | |
| 2004/0139367 A1 * | 7/2004 | Boyd | G06F 11/1474 714/6.3 |
| 2004/0259062 A1 | 12/2004 | Heller et al. | |
| 2005/0283641 A1 | 12/2005 | Clark et al. | |
| 2010/0174752 A1 * | 7/2010 | Kimmel | G06F 11/1435 707/791 |
| 2013/0159258 A1 | 6/2013 | Belisle et al. | |
| 2013/0191344 A1 | 7/2013 | Reed et al. | |
| 2016/0217027 A1 * | 7/2016 | Chauvet | G06F 11/0727 |

OTHER PUBLICATIONS

Lu et al., "Avio: Detecting Atomicity Violations Via Access-Interleaving Invariants," IEEE Computer Society, Jan.-Feb. 2007, pp. 26-35.

* cited by examiner

IN-CORE SYNC PAGE 60

| TIME | OPERATION | SNAME | PLEX ID | UPD KEY | PD KEY |
|---|---|---|---|---|---|
| 00:10:35 | INSERT | SYS1 | PLEXA | 1234 | - |
| 00:10:36 | DELETE | SYS2 | PLEXA | 4321 | 4321 |
| 00:10:39 | INSERT | SYS2 | PLEXA | 1004 | - |
| 00:10:41 | INSERT | SYS4 | PLEXA | 9934 | - |
| 00:10:45 | INSERT | SYS3 | PLEXA | 5674 | - |
| 00:10:46 | INSERT | SYS3 | PLEXA | 5433 | - |

FIG.3a

INITIAL ROGUE UPDATE UNIDENTIFIABLE ON DASD SYNC PAGE 62

| TIME | OPERATION | SNAME | PLEX ID | UPD KEY | PD KEY |
|---|---|---|---|---|---|
| 00:10:35 | INSERT | SYS1 | PLEXB | 7943 | - |
| 00:10:36 | DELETE | SYS2 | PLEXB | 8854 | 8854 |
| 00:10:39 | INSERT | SYS2 | PLEXB | 0004 | - |
| 00:10:40 | DELETE | SYS4 | PLEXB | 5287 | 5287 |
| 00:10:41 | INSERT | SYS4 | PLEXA | 9934 | - |
| 00:10:45 | INSERT | SYS3 | PLEXA | 5674 | - |
| 00:10:46 | INSERT | SYS3 | PLEXA | 5433 | - |

FIG.3b

INITIAL ROGUE UPDATE ON DASD SYNC PAGE 64

| TIME | OPERATION | SNAME | PLEX ID | UPD KEY | PD KEY |
|---|---|---|---|---|---|
| 00:10:35 | INSERT | SYS1 | PLEXA | 1234 | - |
| 00:10:36 | DELETE | SYS2 | PLEXA | 4321 | 4321 |
| 00:10:39 | INSERT | SYS2 | PLEXA | 1004 | - |
| 00:10:40 | DELETE | SYS4 | PLEXB | 2874 | 2874 |
| 00:10:41 | INSERT | SYS4 | PLEXA | 9934 | - |
| 00:10:45 | INSERT | SYS3 | PLEXA | 5674 | - |
| 00:10:46 | INSERT | SYS3 | PLEXA | 5433 | - |

PROCESSING OF PDSE EXTENDED SHARING VIOLATIONS AMONG SYSPLEXES WITH A SHARED DASD

BACKGROUND

1. Field of the Invention

The present invention relates to data storage for computer sysplexes ("SYStem comPLEXES"), and more specifically, to the processing of partition dataset extended (PDSE) extended sharing violations among multiple sysplexes connected with a shared direct access storage device (DASD).

2. Description of the Related Art

A computer sysplex ("SYStem compPLEX") refers to a tightly coupled cluster of independent instances of an operating system (OS) such as z/OS®. A sysplex enables the linking of multiple system images within multiple machines and treating them all as a single image. A sysplex can be a monoplex, a basic sysplex or a parallel sysplex for example. What makes a group of systems or OS images into a sysplex is the inter-image communication.

A parallel sysplex includes multiple computer systems or logical partitions (LPARs) that communicate using a Coupling Facility (CF) or cross-system coupling facility (XCF). The CF or XCF may reside on a dedicated stand-alone server configured with processors that can run Coupling Facility control code (CFCC), as integral processors on the systems themselves configured as ICFs (Internal Coupling Facilities), or less common, as normal LPARs. The CF or XCF contains Lock, List, and Cache structures to help with serialization, message passing, and buffer consistency between multiple LPARs. The primary goal of a parallel sysplex is to provide data sharing capabilities, allowing multiple databases for direct reads and writes to shared data.

A sysplex may store data on a Direct Access Storage Device or DASD, which is any secondary storage device in which each physical record has a discrete location and a unique address. DASD may include, for example, disk drives, magnetic drums or data cells. DASD may use sequential, indexed or direct access methods. The direct access capability allows records on DASD to be accessed without having to read through intervening records from the current location. Direct access is much faster than sequential access.

DASD is designed to be used within a single sysplex. The OS on each system includes access logic to "open" and "close" a dataset. The internal communications within the sysplex e.g. the CF or XCF in a parallel sysplex enforces serialization or permitted multiple access to datasets on DASD.

A dataset is a computer file having a record organization. A partitioned dataset (PDS) contains multiple "members" each of which holds a separate sub-dataset. Partitioned dataset extended (PDSE) is an improvement on the PDS file structure. PDSE files have a better directory structure that does not require pre-allocation of directory blocks when the PDSE is defined.

A PDSE dataset is stored on a single volume and includes a directory and zero or more members. Each member is similar to a sequential dataset. The directory is a series of keyed 256-byte blocks that contain entries for the members in the PDSE. Each entry comprises a member name and a pointer plus some optional user data. PDSE datasets are stored on disk as fixed 4 kb blocks known as "pages". Each member comprises records that are processed in sequence and stored as a hierarchy (e.g. a B+ tree structure) of fixed-size pages including index pages that contain pointers to pages at lower levels in the hierarchy and data pages at the lowest level in the hierarchy. Each computer system runs a PDSE address space (as a started task) to process PDSE datasets. A complete description of PDSE datasets and their usage is provided in the IBM Partitioned Dataset Extended Usage Guide, May 2005, which is hereby incorporated by reference.

Unlike standard datasets and even PDSs, PDSEs can be shared at both dataset and member levels. Users on one or more systems within a defined sysplex can access a PDSE concurrently to create, read, or replace members. PDSEs open for output can be shared among users on a single system (normal sharing) or among users on multiple systems in a sysplex (extended sharing). The system uses XCF signaling and global resource serialization (GRS) to communicate between PDSE address spaces to ensure dataset integrity in the extended sharing mode. A full description of PDSE sharing and serialization is provided in Chapter 8 of the Usage Guide.

As stated in Chapter 8.6.2 of the Usage Guide, "PDSE extended sharing is limited to a single sysplex because PDSE extended sharing uses the cross-system coupling facility (XCF) in addition to global ENQs to implement its sharing protocol. XCF only operates within a single sysplex. If you are sharing PDSEs among multiple sysplexes or with a system outside of the sysplex, you must specify PDSE-SHARING(NORMAL) on each of the systems." "All systems sharing a PDSE must be communicating with each other and must be operating in the same sharing mode to prevent damage to the dataset. If you share a PDSE outside a GRSplex only read access is allowed. Any attempt to update the PDSE may result in damage to the PDSE structures."

BRIEF SUMMARY

To achieve greater storage performance, reliability and diagnostic capability for customers and storage providers alike, a variety of improvements to storage environments continue to be made.

As clearly stated in the IBM PDSE Usage Guide 2005, PDSE Extended Sharing is limited to a single sysplex. The XCF and GRS facilities enforce serialization or permitted multiple concurrent access to data shared on DASD only for connected systems within the sysplex. The XCF and GRS facilities cannot be used to communicate with connected systems outside the sysplex to enforce serialization. Any attempt to update a PDSE dataset from a system outside the sysplex may result in damage to the PDSE structure.

Unfortunately, customers will improperly connect multiple sysplexes to shared DASD when PDSE Extended Sharing is enabled. They may do this for expedience, to avoid the costs of additional storage (e.g. another DASD) or because they are simply unaware that PDSE extended sharing is not supported across multiple sysplexes. Because there exists no means of communication between the sysplexes, there is no mechanism to enforce serialization or to monitor permitted multiple concurrent access among the sysplexes to data shared on DASD. This may result in unserialized access to PDSE datasets and possible dataset corruption being hardened to DASD. These types of serialization errors can be very difficult to diagnose and to fix should they occur.

Because PDSE extended sharing relies on XCF to communicate extended sharing, serialization cannot be extended to multiple sysplexes. The system could be configured to simply foreclose multiple sysplexes from being connected to shared DASD when PDSE extended sharing is enabled. However, in many instances multiple sysplexes can be connected to shared DASD without causing PDSE dataset corruption. The PDSE dataset can have hundreds or thousands of members. It is often the case that different sysplexes may have different members open for update that do not corrupt the dataset.

The present invention is configured to detect "rogue" updates from outside the sysplex in a reactive manner, diagnose the type of error associated with the rogue update, log and notice all systems in the sysplex of the error (and eventually connected systems outside the sysplex) and, for certain types of errors, fix the PDSE data set. This approach allows customers to "break the rules" of PDSE extended sharing usage while providing customers (and service providers) with notices of potential errors caused by this action and logging information needed to later diagnose and fix any such problems.

According to one embodiment of the present invention, a sync page is added to the PDSE dataset. The sync page comprises a list of the most recent index update records (IURs), each record including a time stamp, a name of the updating system, a sysplex ID and an index key of the updated record. An in-core version of the sync page stored in local cache maintains a list of IURs for all computer systems within a sysplex and an on-DASD version of the sync page stored on shared DASD maintains a list of IURs for all computer systems connected to shared DASD. A PDSE error handling module in each computer system is configured such that upon detection of a PDSE processing error the module compares the in-core and on-DASD sync pages to determine whether the PDSE dataset has been updated by a rogue system outside the sysplex, diagnoses a type of error associated with the rogue update, logs and notices all systems in the sysplex of the error and, if an initial rogue update is identifiable from the sync pages, synchronizes the index records in local cache of the detecting system and on shared DASD According to different embodiments, if the sync pages are the same, an error record entered into the in-core sync page and the error message surfaced to the detecting system will indicate that the PDSE dataset is "suspect" and the PDSE processing error is of an unknown source. If the sync pages differ and the on-DASD sync page either does not contain the initial rogue update or does contain the initial rogue update but connections for output to the PDSE dataset exist, the error record entered into the in-core sync page and the error message surfaced to the detecting system will indicate that the PDSE dataset is "suspect" and the PDSE processing error is a serialization error.

According to different embodiments, if the sync pages differ and the on-DASD sync page includes the initial rogue update, the module determines whether all the index records affected by the rogue updates are resident in local cache of the detecting system. If all of the index records are available the PDSE dataset is "repairable". The module replaces the affected index records on DASD with the index records in local cache and surfaces a message that the PDSE dataset has been repaired. If all of the index records are not available, the error to the PDSE dataset may be "tolerable". If there are no connections for output to the PDSE dataset and the detecting system user so chooses, the module may re-read the index records from DASD to local cache and surface a message of a tolerable error.

According to another embodiment of the present invention, a method of detecting PDSE extended sharing violations comprises defining in shared DASD an on-DASD sync page within each PDSE dataset. The on-DASD sync page is a fixed-size page comprising a list of the most recent index update records, each record including a time stamp, a name of the updating system, a sysplex ID and an index key of the updated record. Upon receipt of a request to open the PDSE dataset from a system connected to the shared DASD, the on-DASD sync page is loaded to local cache in the connected system as an in-core sync page. For each update made to an index record by a connected system, an index update record is entered in the in-core sync page stored in the local cache of that system. The in-core sync pages are synchronized among connected systems within a sysplex and written to the shared DASD to update the on-DASD sync page. Upon detection of a potential serialization error, the on-DASD sync page is reloaded to local cache of the detecting system and compared to the in-core sync page. The method suitably clears the in-core sync page, enters an error record into the in-core sync page, surfaces an error message to the detecting system and writes the in-core sync page to shared DASD to append the in-core entries to the on-DASD sync page. Clearing the sync page is generally preferable for all types of errors but is particularly useful in the case of a repair to avoid cyclical detection and repair. If the sync pages differ and an initial rogue update can be identified, the method synchronizes the index records in local cache of the detecting system with the index records on shared DASD depending on whether the rogue update is "repairable" or "tolerable".

According to another embodiment of the present invention, a computer network includes multiple sysplexes connected to shared DASD with PDSE extended sharing enabled for PDSE datasets on DASD. A sync page is added to each PDSE dataset. Each computer system within each sysplex is provided with a PDSE error-handling module. Upon detection of a PDSE processing error by any connected system, that system's module processes its in-core sync page and the on-DASD sync page to determine whether a rogue update from outside the sysplex has occurred, diagnose the error, log and notice all systems in the sysplex of the error and, if an initial rogue update is identifiable to synchronize the index records in local cache with those on shared DASD.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As clearly stated in the IBM PDSE Usage Guide 2005, PDSE Extended Sharing is limited to a single sysplex. The XCF and GRS facilities enforce serialization or permitted multiple concurrent access to data shared on DASD only for connected systems within the sysplex. The XCF and GRS facilities cannot be used to communicate with connected systems outside the sysplex to enforce serialization. Any attempt to update a PDSE dataset from a system outside the sysplex may result in damage to the PDSE structure. Unfortunately, customers will improperly connect multiple sysplexes to shared DASD when PDSE Extended Sharing is enabled. This may result in unserialized access to PDSE datasets and possible dataset corruption being hardened to DASD. These types of serialization errors can be very difficult to diagnose and to fix should they occur.

To achieve greater storage performance, reliability and diagnostic capability for customers, different embodiments provide for detection of "rogue" updates from outside the sysplex in a reactive manner, diagnosis of the type of error associated with the rogue update, logging and notice of all systems in the sysplex of the error (and eventually connected systems outside the sysplex) and, for certain types of errors, fixing the PDSE dataset. A sync page is added to each PDSE dataset. An "in-core" version of the sync page maintains a list of index update records for all systems in a sysplex. An "on-DASD" version of the sync page maintains a list of index update records for all systems connected to shared DASD. A PDSE error-handling module on each connected system monitors the two versions of the sync page to diagnose, log and notice errors, and to possible fix the PDSE dataset. This approach allows customers to "break the rules" of PDSE extended sharing usage while providing customers (and service providers) with notices of potential errors caused by this action and logging information needed to later diagnose and fix any such problems.

As used herein, a "sysplex" is a configuration of one or more computer systems that share PDSE data sets stored on shared DASD. Each system comprises a PDSE address space and a server configured to implemented extended sharing of PDSE datasets at the member level using a cross-system coupling facility (XCF) and a General Resource Serialization (GRS) that enforce serialization at the member level within the sysplex. A "PDSE dataset" comprises a directory and a plurality of members. Each member comprises records that are processed in sequence and physically stored as a hierarchy of fixed-size pages including index pages that contain pointers to pages at lower levels in the hierarchy and data pages at the lowest level in the hierarchy.

Figure 1:
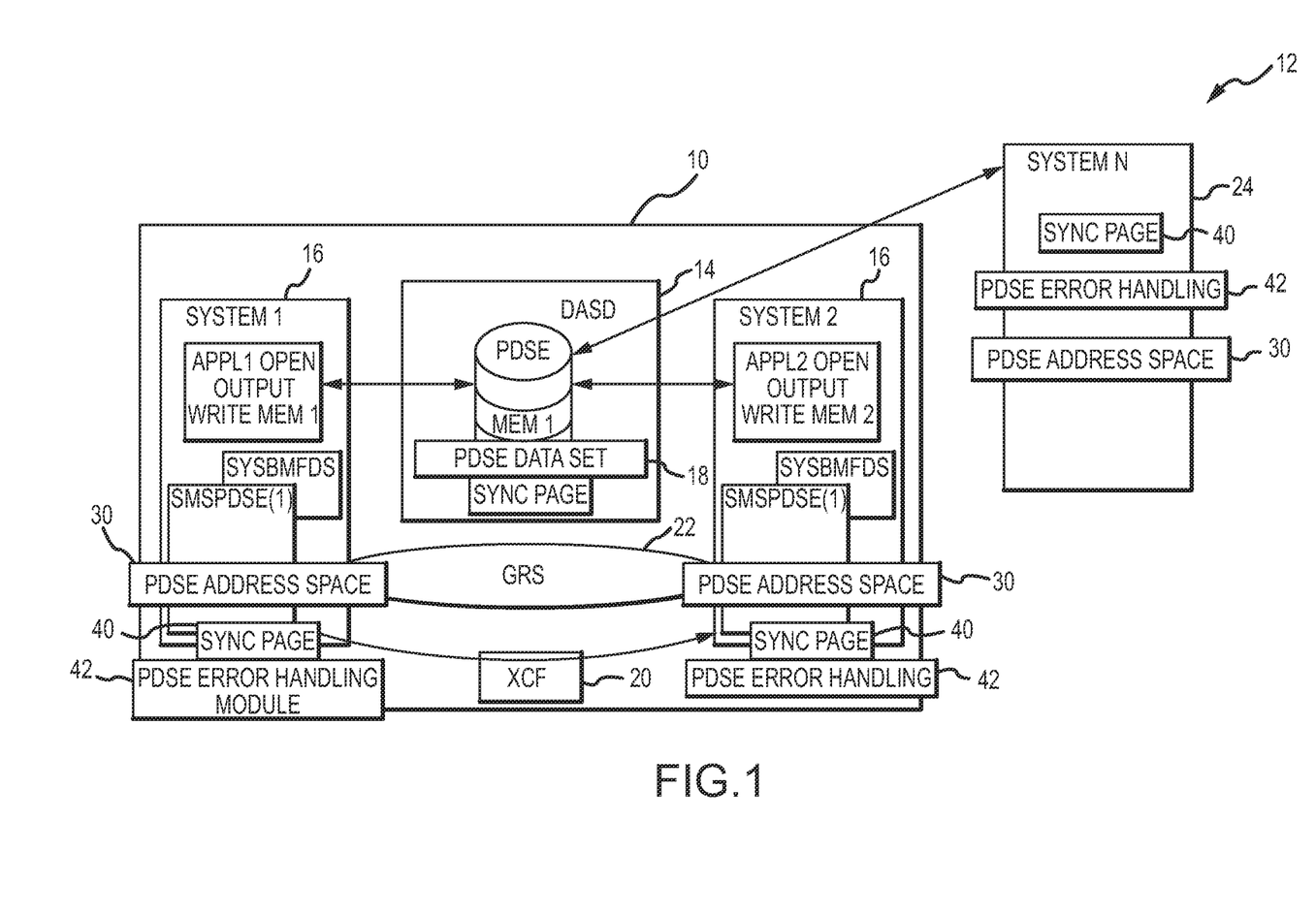
FIG. 1 is a block diagram of an embodiment of a computer network in which multiple sysplexes are connected to a shared DASD with each sysplex is configured to implement PDSE Extended Sharing within the sysplex and to implement detection and processing of PDSE Extended Sharing violations among the sysplexes.

With reference now to FIG. 1, in an embodiment of the invention a parallel sysplex 10 and a monoplex 12 are connected to shared DASD 14. In this example, monoplex 12 is connected to the shared DASD 14 that is part of parallel sysplex 10. Various configurations of multiple sysplexes connected to shared DASD 14 are possible including but not limited to multiple monoplexes connected to share the DASD of a single parallel sysplex, multiple monoplexes connected to a shared DASD, multiple parallel sysplexes and/or base sysplexes connected to shared DASD or combinations thereof. In configurations that include at least one base or parallel sysplex the field (stored in memory with each system) that indicates whether DASD can be shared will have been set to enable sharing of the multiple systems within the base or parallel sysplex. More particularly, PDSE-SHARING(EXTENDED) must be set on each of the connected systems.

Parallel sysplex 10 comprises multiple host systems 16, e.g., System 1, to System N that access data sets on DASD 14 that is shared among the systems. Each system includes one or more computing processors and memory. An instance of an operating system (OS) such as z/OS® runs on each system of the sysplex. Each instance of the OS includes access logic to process "open" and "close" requests for PDSE datasets 18 on shared DASD. A unit control block (UCB) stored in memory describes DASD 14 for each system 16. The field in the UCB that allows DASD to be shared among multiple systems must be set to allow extended sharing.

The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then running on another system at another point in time. To help facilitate the activity, the systems 16 are each coupled to an external time reference component, a cross-system coupling facility (XCF) 20 and a global resource service (GRS) 22. Connections to DASD 14 are facilitated through a dynamic switch.

Monoplex 12 comprises a single host system 24, e.g., System M. The host system includes one or more computing processors and memory. An instance of an operating system (OS) such as z/OS® runs on the system. The OS includes access logic to process "open" and "close" requests for PDSE datasets 18. The host system is connected to DASD. The host system may be connected directly through its own dynamic switch or through the dynamic switch of parallel sysplex 10. A UCB stored in memory describes DASD. The field in the UCB that allows DASD to be shared is set to allow sharing.

DASD 14 is any secondary storage device in which each physical record has a discrete location and a unique address. DASD may include, for example, disk drives, magnetic drums or data cells. DASD may use sequential, indexed or direct access methods. The direct access capability allows records on DASD to be accessed without having to read through intervening records from the current location. Direct access is much faster than sequential access. DASD 14 is configured to store PDSE dataset 18 on a given volume to facilitate sharing of the dataset among the various connected systems.

Each connected system is configured to run a PDSE address space 30 as a started task to process the PDSE dataset 18 stored on shared DASD 14 and in part in the system's local cache. PDSESHARING(EXTENDED) must be set on each of the connected systems to enable extended sharing of the PDSE datasets stored on shared DASD 14. Serialization is enforced by XCF 20 and GRS 22 among the connected systems within parallel sysplex 10.

Connected system 24 outside sysplex 10 has full access to PDSE dataset 18 in violation of the extended sharing requirements prescribed in chapter 8.6.2 of the Usage Guide. From the perspective of shared DASD 14, DASD sees each connected system the same. DASD has no mechanism to differentiate connected systems in order to enforce serialization. Attempts to update the PDSE dataset from outside the sysplex, referred to as "rogue updates", may result in damage to the PDSE dataset structures. When the rogue system makes a request to update the PDSE dataset that would be denied if the system were part of the sysplex, the rogue system cannot receive the "XCF invalid" message that would ordinarily prevent the system from updating the PDSE dataset.

In an embodiment of the invention, a single special page referred to as a "sync" page 40 is added to the PDSE dataset 18. The sync page is created at allocation time by the computing system in charge of PDSE dataset allocation The sync page is loaded from DASD to local cache at PDSE dataset open and remains open until the last close of the PDSE dataset. The in-core version of the sync page maintains a list of index update records for all computer systems within a sysplex and the on-DASD version of the sync page maintains a list of index update records for all computer systems connected to shared DASD. By leveraging properties of the sync page, and more particularly by monitoring any differences in the in-core and on-DASD sync pages, a PDSE error handling module 42 can programmatically determine when a PDSE dataset has been accessed by a rogue system, diagnose the type of error associated with the rogue update, log and notice of all systems in the sysplex of the error (and eventually connected systems outside the sysplex) and, for certain types of errors, fix the PDSE dataset. The system is reactionary in nature and always from the perspective of the system that detects the occurrence of a PDSE processing error. The age of an initial rogue update associated with a processing error will to a large extent determine the information that can be logged about the error and to what, if any, extend the PDSE dataset may be fixed. Serialization in general, and the use of the "sync" page in particular are directed to the retrieval and delivery of the dataset, and specifically the index records, not the content of those index records.

Sync page 40 is a fixed size page that comprises a list of the most recent index update records (IURs). Each index update record includes a time stamp, a name of the updating system, a sysplex ID of the updating system, an index key of the updated records and an index key of the pending delete (if created). The records of updates in the sync page naturally limited by the fixed size of the page so the page will only contain a set of the most recent updates. Index update records refer to records of changes to the PDSE dataset's index regardless of the client operation (member add, delete, update in place) that caused the update to the index.

Figure 2:
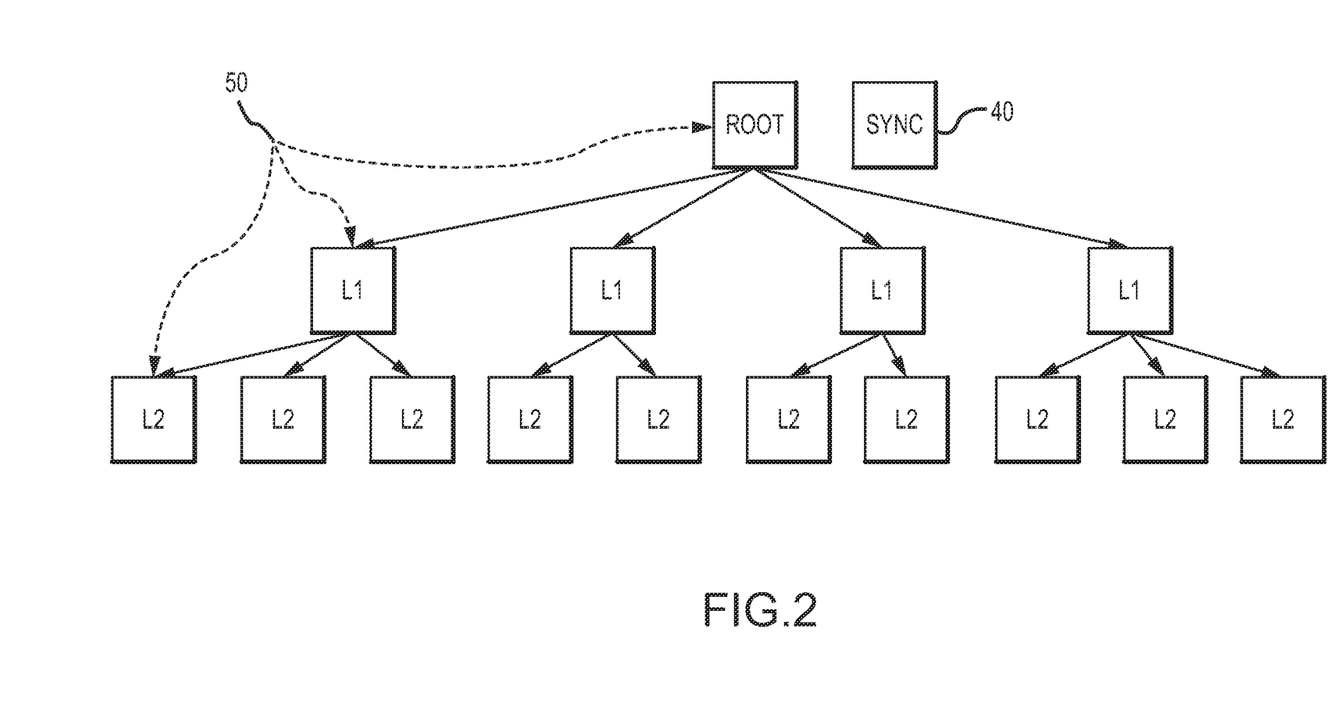
FIG. 2 is a diagram of an embodiment of a page structure of a PDSE dataset including a sync page configured to facilitate detection and processing of PDSE Extended Sharing violations.

With reference now to FIG. 2, in an embodiment sync page 40 is added to the page structure of a PDSE dataset. PDSE datasets are stored on disk as fixed 4 kb blocks known as "pages" 50 e.g. the "root", L1 and L2 pages. Each member comprises records that are processed in sequence and stored as a hierarchy (e.g. a B+ tree structure) of fixed-size pages including index pages that contain pointers to pages at lower levels in the hierarchy and data pages at the lowest level in the hierarchy.

The sync page 40 is a standard 4k page pointed to by the VDF page and part of the initial page load at open time. The sync page contains "index update records". An index update records identifies the index page (record) that was updated. The sync page is managed like any other page in the PDSE dataset except that it is never removed from local cache until the final close of the PDSE dataset.

Sync page 40 is defined in shared DASD at allocation time as an "on-DASD" sync page with each PDSE dataset. Upon receipt of a request to open the PDSE dataset from a system connected to the shared DASD, the on-DASD sync page is loaded to local cache in the connected system as an "in-core" sync page. At "open", typically the first 5 pages of the PDSE dataset are loaded to local, the sync page becomes the $6^{th}$ page loaded at open. For each update made to an index record by a connected system, an index update record is entered in the in-core sync page stored in the local cache of that system. The standard page management synchronizes the in-core sync pages among connected systems within a sysplex so that the pages are always up to date and the same. The in-core sync page is written to the shared DASD to update the on-DASD sync page at commit time.

Figure 3A:
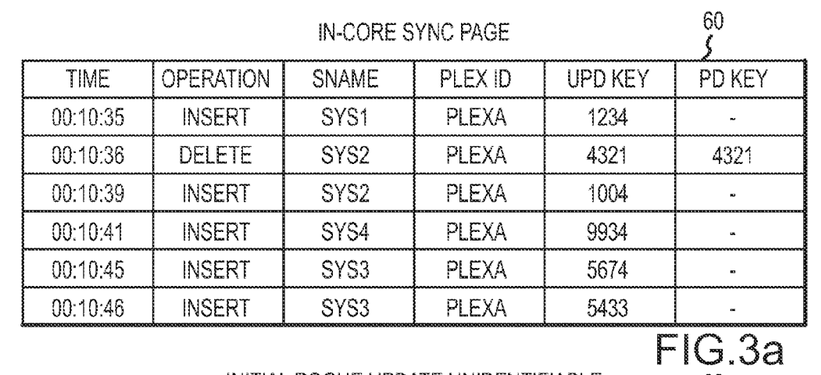
FIG. 3a is an example of an in-core sync page stored in the local cache of a connected system.
Figure 3B:
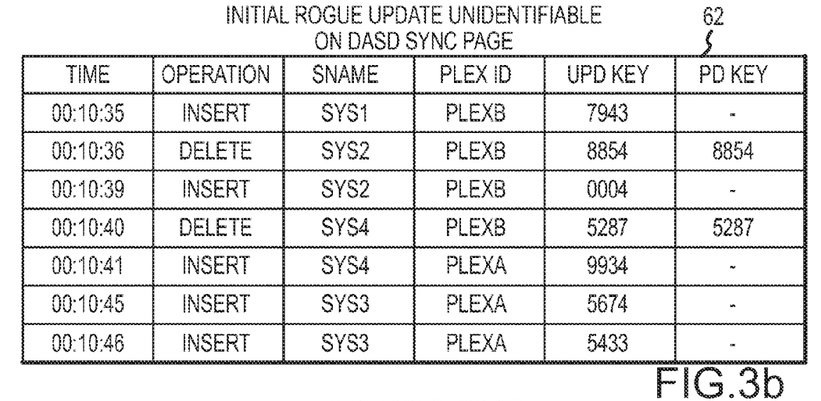
FIG. 3b is an example of an on-DASD sync page that includes rogue updates in which the initial rogue update is not identifiable and FIG. 3c an example of an on-DASD sync page that includes rogue updates in which the initial rogue update is identifiable.
Figure 3C:
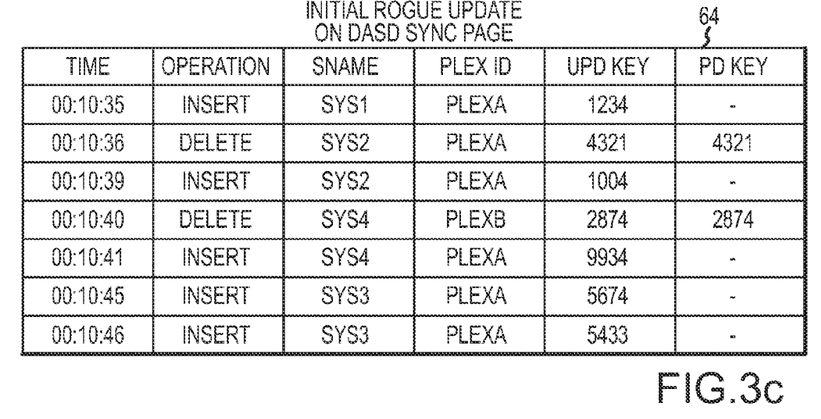

With reference now to FIGS. 3a, 3b and 3c, FIG. 3a illustrates an example of an in-core sync page 60 that is maintained in the local cache of the connected systems within a sysplex, PLEXA. As different systems in PLEXA update index records in the PDSE data set corresponding index update records are entered into in-core sync page 60 by each connected system and synchronized among all systems in PLEXA to keep the in-core sync page up to date and synchronized within PLEXA. In this embodiment, each index update record includes a time stamp, the operation performed, name of the system performing the operation, the name of the sysplex, the index key of the updated records and the pending delete key if it exists. Because the sync page is of fixed-size, the page will maintain only the most recent index update records for the sysplex.

At commit time, the in-core sync page 60 is written to shared DASD to update an on-DASD sync page. The entries in the in-core sync page 60 are added to the existing entries in the on-DASD sync page. As the on-DASD sync page is also of fixed-size equal to the in-core sync page (and all other pages), the on-DASD sync page will maintain only the most recent index update records for all connected systems.

If a PDSE processing error occurs but the in-core and on-DASD sync pages are the same, the PDSE dataset is deemed to be "suspect" but the source of the error is deemed to be from an "unknown source". This information is logged and surfaced as a message to the detecting system, synchronized to all other systems in the sysplex and eventually raised to all other connected systems. The error may have been caused by a serialization error from a rogue system outside the sysplex but that cannot be determined. If a serialization error was the cause it occurred long enough ago that the updated index records associated with the rogue update have rolled out of the on-DASD sync page and cannot be detected.

FIG. 3b illustrates an example of an on-DASD sync page 62 upon the detection of a PDSE processing error by a connected system (the detecting system) within sysplex PLEXA. In this example, the in-core sync page 60 and on-DASD sync page 62 differ. The in-core sync page only includes entries from systems within sysplex PLEXA. The on-DASD sync page includes entries from systems within PLEXA and PLEXB. As shown in this example, the oldest entries in on-DASD sync page 62 are from systems within PLEXB outside of the detecting system's sysplex PLEXA. This is also a flag that the PDSE dataset is "suspect" and that the cause of the problem is a "serialization error" due to a system in a sysplex outside the detecting system's sysplex updating the PDSE dataset.

In this example, one cannot determine whether an initial rogue update from a system in PLEXB is in the on-DASD sync page or has rolled out of the sync page. The update at 10:35 by SYS1 in PLEXB may or may not be the initial rogue update; it is indeterminate. The consequence of not being able to determine the initial rogue update is that the PDSE dataset cannot be fixed; the index records stored in local cache cannot be "synchronized" to the index records on DASD. The users have the option to proceed knowing the PDSE dataset is "suspect" or to reload the dataset from backup.

FIG. 3c illustrates an example of an on-DASD sync page 64 upon the detection of a PDSE processing error by a connected system (the detecting system) within sysplex PLEXA. In this example, the in-core sync page 60 and on-DASD sync page 64 differ. The in-core sync page only includes entries from systems within sysplex PLEXA. The on-DASD sync page includes entries from systems within PLEXA and PLEXB. As shown in this example, the index update record entry from the system in PLEXB resides in the middle of the on-DASD sync page. As a result, a comparison of the in-core sync page 60 and the on-DASD sync page 64 reveals an overlap of the last good update from a system in PLEXA with a first update from a system in PLEXB. This overlap indicates the existence of an initial rogue update. In other words, the comparison of the in-core and on-DASD sync page produces a difference page. If the first difference occurs anywhere other than the first entry in the page than the initial rogue update was captured in the on-DASD sync page.

The identification of the initial rogue update allows the PDSE dataset to be fixed; the index records stored in local cache can be "synchronized" to the index records on DASD. There are two options for fixing the PDSE dataset. A first option is to "repair" the index records affected by the "rogue" update and write the repaired index records back to DASD. This has the effect of declaring the detecting system and its sysplex the winner and synchronizing the PDSE dataset back to that sysplex. A second option is to "tolerate" the changes in the index records caused by the "rogue" update and copy the index records from DASD into local cache in the detecting system and all systems within its sysplex. This has the effect of declaring the rogue system and its sysplex the winner and synchronizing the PDSE dataset back to DASD. In each case, the nature of the error "repairable" or "tolerable" is logged and a message is surfaced to the detecting systems, all systems in its sysplex and eventually all connected systems. Repairing the index records is generally preferred. However, in order to repair the index records all of the index records affected by the rogue updates must be present in the local cache of the detecting system. The PDSE caching process guarantees that the pages in local cache will be the most recent copies of the pages known to the detecting system. However due to the LRU nature of cache page re-use the lifespan of a page in cache will vary due to system load and cache utilization.

From the perspective of the shared DASD, DASD only sees individual connected systems. DASD does not see sysplexes, and specifically does not see a certain sysplex or systems within the sysplex as the desired systems and other sysplexes or systems therein as "rogue" systems. What is "rogue" is determined from the perspective of the detecting system for a given PDSE processing error. For example, if a system in PLEXA detects an error, updates from any system outside PLEXA will be considered to be "rogue". Thereafter, if a system in PLEXB detects an error, updates from any system outside PLEXB will be consider "rogue" and so forth.

Figure 4A:
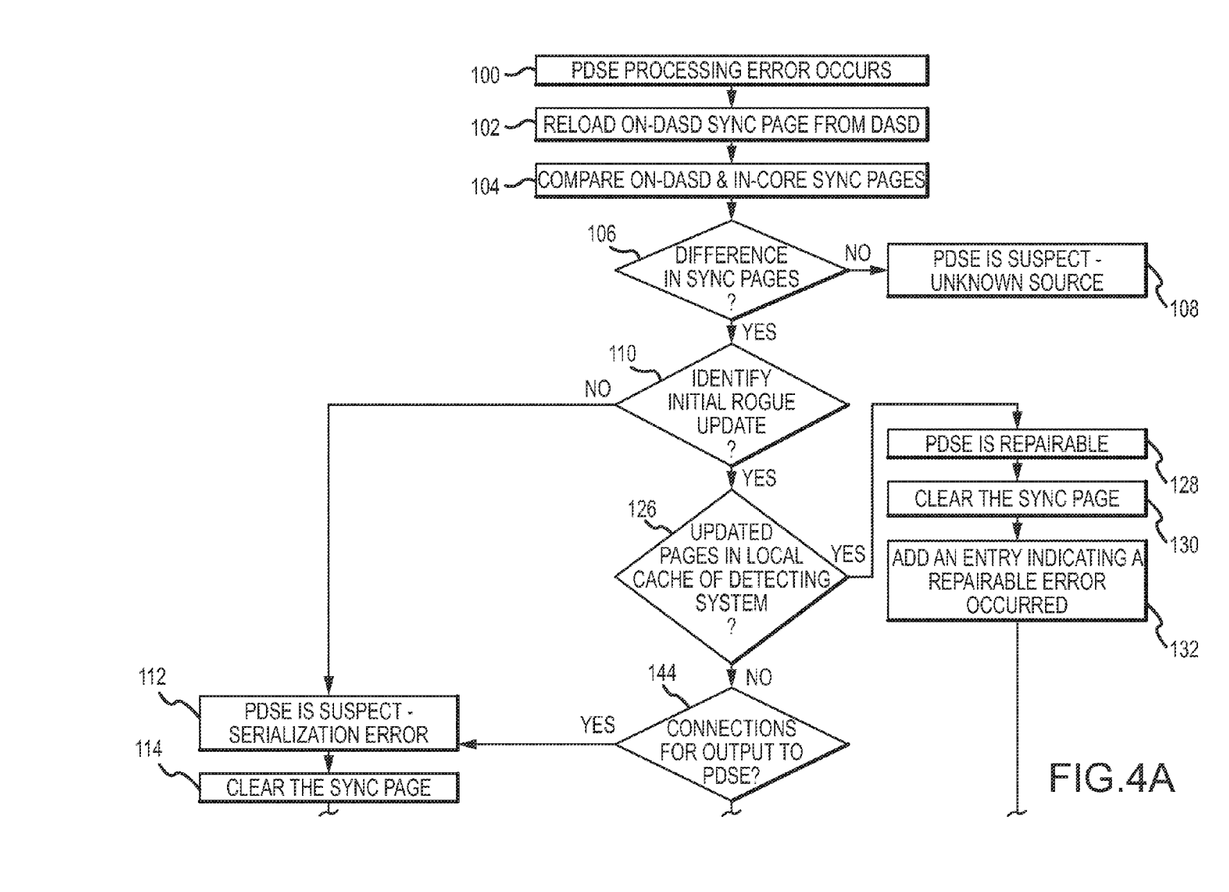
FIGS. 4a and 4b are a flow diagram of an embodiment of a method for detection and processing of PDSE Extended Sharing violations.
Figure 4B:
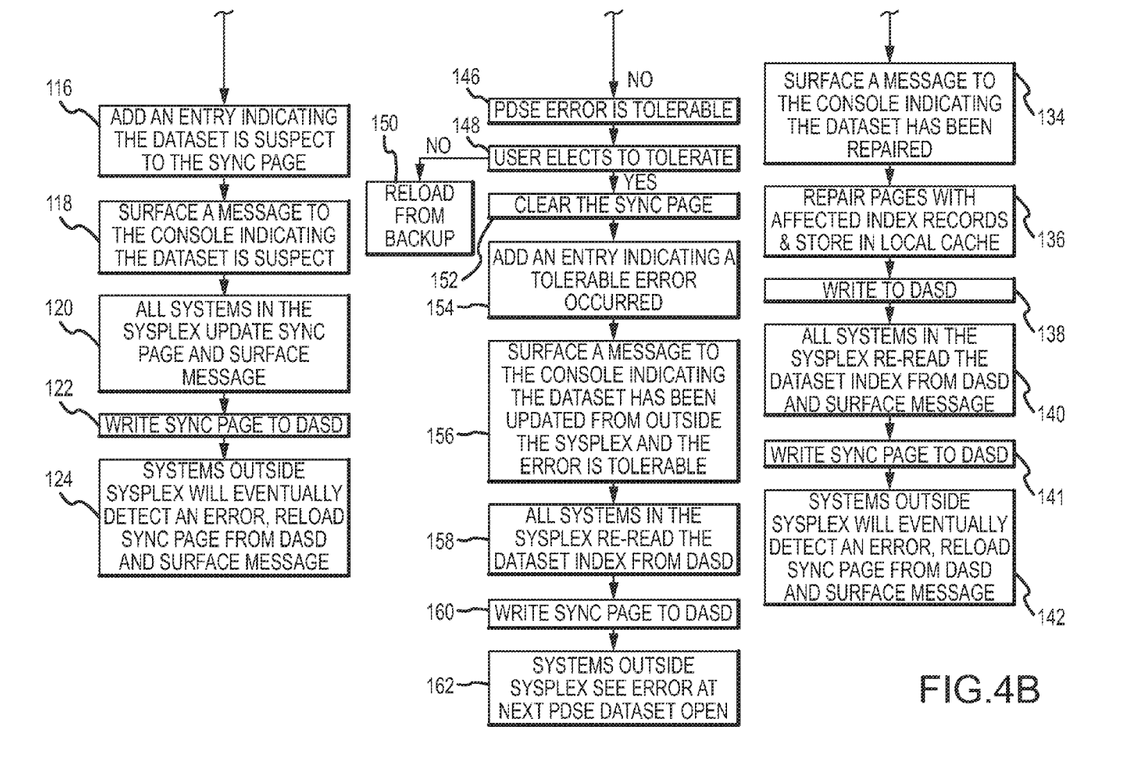

With reference now to FIGS. 4a and 4b, an embodiment of the steps executed by the detecting system and more particularly its PDSE error-handling module are illustrated. A PDSE processing error can be any one of many possible errors that the system is already configured to detect. A subset of these errors that may be caused by violations of extended sharing and serialization between multiple sysplexes are reported to the error-handling module. Upon receipt of a PDSE processing error (step 100), the detecting system's module reloads the on-DASD sync page from DASD to its local cache (step 102) and compares the on-DASD sync page to the in-core sync page (step 104) to determine whether the pages differ (step 106).

If there is no difference in the sync pages, the module declares the PDSE dataset to be suspect and the error of an unknown source (step 108). The module clears the in-core sync page (optional), adds an entry to the in-core sync page indicating the dataset is suspect—unknown source, and surfaces a message to the console of the detecting system to this effect. Using the standard communication facilities, all systems in the detecting system's sysplex update their in-core sync pages and surface the same or similar message. The entry and surfaced message will typically identify the rogue system and sysplex. The detecting system writes the in-core sync page to DASD at commit time to update the on-core sync page. Systems outside the sysplex will eventually detect an error, reload the on-DASD sync page and surface a message.

If the sync pages differ, the module attempts to identify an initial rogue update in the on-DASD sync page (step 110). If unsuccessful, the module declares the PDSE dataset to be suspect and the error to be a serialization error (step 112). The module clears the in-core sync page (step 114) (optional), adds an entry to the in-core sync page indicating the dataset is suspect—serialization error (step 116), and surfaces a message to the console of the detecting system to this effect (step 118). Using the standard communication facilities, all systems in the detecting system's sysplex update their in-core sync pages and surface the same or similar message (step 120). The entry and surfaced message will typically identify the rogue system and sysplex. The detecting system writes the in-core sync page to DASD at commit time to update the on-core sync page (step 122). Systems outside the sysplex will eventually detect an error, reload the on-DASD sync page and surface a message (step 124).

If the initial rogue update is identified, the module determines whether all of the pages that contain index records affected by the rogue update as indicated by the index update records that differ between the in-core and on-DASD sync pages are present in the detecting system's local cache (step 126). B* trees are complex structures. A rogue update to an index record in a page is an algorithmic operation whose effects may span multiple pages (and index records) and may result in splits or consolidations of pages. The local cache of index records is unrelated to whether index update records are in the sync page. Each system deletes pages from its cache as they age since the last open.

If all of the index records are present, the module declares the PDSE dataset to be "repairable" and the error to be a repairable serialization error (step 128). The module clears the in-core sync page (step 130) (to avoid cyclic error detection and repair by systems in different sysplexes), adds an entry to the in-core sync page indicating the dataset is repairable (step 132), and surfaces a message to the console of the detecting system that the error has been repaired (step 134). Because the B* algorithm is symmetrical, the module can work backwards from the complete list of rogue updates, reverse the algorithmic changes to the pages that contain the affected index records and stored the repaired index records in local cache (step 136). The repaired index records are written to DASD to replace the corresponding index records (step 138). Using the standard communication facilities, all systems in the detecting system's sysplex update their in-core sync pages, surface the same or similar message and re-read the PDSE dataset index from DASD (step 140). Re-reading the dataset index is equivalent to rereading the index records. The in-core sync page is written to DASD to update the on-DASD sync page (step 141). Systems outside the sysplex will eventually detect an error, reload the on-DASD sync page and surface a message (step 142).

A preferred scenario for repairing a rogue update is a PDSE dataset for which the rogue update is interleaved with legitimate updates. In that scenario the rogue update will be detected immediately with the minimum number of pages needing to be recovered. The PDSE datasets that have the highest update traffic will have the best chances of recovering from a rogue update. The sync page will be immediately cleared and marked with the repair to prevent circular repairs from rogue systems. The rogue update pages will then be replaced by the old cached copies and noted in the sync page as part of the repair notation. In cases where an index page was updated by a rogue update and then was further updated by a legitimate update without produced an error, the PDSE dataset will be marked suspect.

If all of the index records are not present, the module determines whether there are connections for output to the PDSE dataset from other connected systems in the same sysplex as the detecting system (step 144). If these connections exists, other systems in the same sysplex may be in the process of updating the dataset locally. Because the update is unknown until commit time, the detecting system cannot fix the dataset. Control is passed back to step 112 and the PDSE dataset is declared to be suspect of serialization error. If no, the error is considered to be "tolerable" (step 146) and the user of the detecting system can elect whether or not to tolerate the error (step 148). If not, the system reloads the PDSE dataset from backup (step 150). If yes, the module clears the in-core sync page (step 152) (optional), adds an entry to the in-core sync page indicating the dataset error is tolerable (step 154), and surfaces a message to the console of the detecting system indicating the dataset has been updated from outside the sysplex and the error is tolerable (step 156). All systems in the sysplex will re-read the dataset index from DASD (step 158). The detecting system writes the in-core sync page to DASD at commit time to update the on-core sync page (step 160). Systems outside the sysplex will see the error at the next PDSE dataset open (step 162). Because the PDSE dataset on DASD has not changed it is not critical that other connected systems outside the sysplex are noticed.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated features, integers, steps, operations, elements, and/or components, but do not preclude the presence or addition of one or more other features, integers, steps, operations, elements, components, and/or groups thereof.#

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.#

What is claimed is:

1. A method of detecting PDSE extended sharing violations in which PDSE extended sharing is not limited to a single sysplex, the method comprising:
    defining in shared DASD an on-DASD sync page within each PDSE dataset, said on-DASD sync page is a fixed-size page comprising a list of the most recent index update records, each record including a time stamp, a name of the updating system, a sysplex ID and an index key of the updated record;
    upon receipt of a request to open the PDSE dataset from a system connected to the shared DASD, loading the on-DASD sync page to local cache in the connected system as an in-core sync page;
    for each update made to an index record by a connected system, entering an index update record in the in-core sync page stored in the local cache of that system, said in-core sync pages synchronized among connected systems within a sysplex and written to the shared DASD to update the on-DASD sync page; and
    upon detection of a PDSE processing error by one of the connected systems,
        reloading the on-DASD sync page from shared DASD to the local cache of the detecting system;
        comparing the in-core sync page to the on-DASD sync page;
        entering an error record into the in-core sync page, surfacing an error message to the detecting system and writing the in-core sync page to shared DASD to update the on-DASD sync page;
        if the in-core and on-DASD sync pages are different and the on-DASD sync page contains an initial rogue update from a connected system outside the sysplex of the detecting system, identifying the index update records that are different following the initial rogue update and synchronizing the index records in local cache of the detecting system and on shared DASD.

2. The method of claim 1, further comprising surfacing the error message to all systems in the sysplex of the detecting system.

3. The method of claim 2, further comprising upon detection of a subsequent PDSE processing error or a next open of the PDSE dataset by a connected system outside the sysplex reloading the on-DASD sync page to local cache and surfacing the error message.

4. The method of claim 1, further comprising identifying an overlap of a last update from a system in the same sysplex as the detecting system and a first update from a connected system outside the sysplex of the detecting system to determine whether the on-DASD sync page contains the initial rogue update.

5. The method of claim 1, wherein if a PDSE processing error is detected and the in-core and on-DASD sync pages are same, the error record entered into the in-core sync page and the error message surfaced to the detecting system indicate that the PDSE dataset is suspect and the PDSE processing error is of an unknown source.

6. The method of claim 1, wherein if the sync pages are different and the on-DASD sync page either does not contain the initial rogue update or does contain the initial rogue update but connections for output to the PDSE dataset exist, the error record entered into the in-core sync page and the error message surfaced to the detecting system indicate that the PDSE dataset is suspect and the PDSE processing error is a serialization error.

7. The method of claim 1, wherein if the on-DASD sync page contains the initial rogue update, further comprising determining whether the index records affected by the rogue updates are all resident in local cache of the detecting system.

8. The method of claim 7, wherein if the index are all resident in local cache of the detecting system, the error record entered into the in-core sync page and the error message surfaced to the detecting system indicate that the PDSE dataset is repairable and has been repaired, wherein synchronizing comprises replacing the affected index records on DASD with the index records in local cache of the detecting system and having all systems in the sysplex re-read the index records from DASD.

9. The method of claim 8, further comprising upon detection of a repairable error clearing the sync page prior to entering the error records.

10. The method of claim 7, wherein if the index records are not all resident in local cache of the detecting system, further comprising determining whether there are any connections for output to the PDSE dataset and whether the detecting system elects to tolerate the error, the error record entered into the in-core sync page and the error message surfaced to the detecting system indicate that the PDSE dataset is tolerable, wherein synchronizing comprises having all systems in the sysplex re-read the index records from DASD.

11. A computer system for detecting PDSE extended sharing violations of a PDSE dataset on shared DASD, said system comprising:
  a fixed-size sync page in each PDSE dataset, said sync page comprising a list of the most recent index update records (IURs), each record including a time stamp, a name of the updating system, a sysplex ID and an index key of the updated record, an in-core version of the sync page stored in local cache maintaining a list of IURs for all computer systems within a sysplex and an on-DASD version of the sync page stored on shared DASD maintaining a list of IURs for all computer systems connected to shared DASD; and
  a PDSE error handling module configured such that upon detection of a PDSE processing error said module compares the in-core and on-DASD sync page to determine whether the PDSE dataset has been updated by a rogue system outside the sysplex, diagnoses a type of error associated with the rogue update, logs and notices the system of the error and, if an initial rogue update is identifiable from the sync pages synchronizes the index records in local cache of the detecting system and on shared DASD.

12. The computer system of claim 11, wherein said PDSE error handling module identifies the initial rogue update by identifying an overlap of a last update from a system in the same sysplex as the detecting system and a first update from a connected system outside the sysplex of the detecting system.

13. The computer system of claim 11, wherein if the in-core and on-DASD sync pages are the same or the sync pages are different and the on-DASD sync page either does not contain the initial rogue update or does contain the initial rogue update but connections for output to the PDSE dataset exist, the module enters an error record into the in-core sync page and surfaces an error message indicating that the PDSE dataset is suspect.

14. The computer system of claim 11, wherein if the on-DASD sync page contains the initial rogue update, the module is configured to determine whether the index records affected by the rogue updates are all resident in local cache of the detecting system, and if resident to clear the sync page and then enter the error record into the in-core sync page and surface the error message indicating that the PDSE is repairable and has been repaired, wherein the module synchronizes the index records by replacing the affected index records on DASD with the index records in local cache of the detecting system and having all systems in the sysplex re-read the index records from DASD.

15. The computer system of claim 11, wherein if the on-DASD sync page contains the initial rogue update, the module is configured to determine whether the index records affected by the rogue updates are all resident in local cache of the detecting system, and if not resident and no connections for output to the PDSE dataset to enter the error record into the in-core sync page and surface the error message indicating that the PDSE is tolerable, wherein the module synchronizes the index records by rereading the index records from DASD.

16. A network of computer systems for detecting PDSE extended sharing violations, said network comprising:
  a direct access storage device (DASD);
  at least one PDSE dataset stored on said DASD;
  a first sysplex comprising one or more computer systems each connected to said DASD, each said computer system having local cache and configured to run a PDSE address space with PDSE extended sharing enabled;
  a second sysplex comprising one or more computer systems each connected to said shared DASD, each said computer system having local cache and configured to run a PDSE address space with PDSE extended sharing enabled;
  a fixed-size sync page in each PDSE dataset, said sync page comprising a list of the most recent index update records (IURs), each record including a time stamp, a name of the updating system, a sysplex ID and an index key of the updated record, an in-core version of the sync page stored in local cache maintaining a list of IURs for all computer systems within a sysplex and an on-DASD version of the sync page stored on shared DASD maintaining a list of IURs for all computer systems connected to shared DASD; and
  a PDSE error handling module on each computer system configured such that upon detection of a PDSE processing error said module compares the in-core and on-DASD sync page to determine whether the PDSE dataset has been updated by a rogue system outside the sysplex, diagnoses a type of error associated with the rogue update, logs and notices the system of the error and, if an initial rogue update is identifiable from the sync pages synchronizes the index records in local cache of the detecting system and on shared DASD.

17. The computer network of claim 16, wherein each system in the sysplex of the detecting system surfaces the error message and wherein upon detection of a subsequent PDSE processing error or a next open of the PDSE dataset by a connected system outside the sysplex that system reloads the on-DASD sync page to local cache and surfaces the error message.

18. The computer network of claim 16, wherein if the in-core and on-DASD sync pages are the same or the sync pages are different and the on-DASD sync page either does not contain the initial rogue update or does contain the initial rogue update but connections for output to the PDSE dataset exist, the module enters an error record into the in-core sync page and surfaces an error message indicating that the PDSE dataset is suspect.

19. The computer network of claim 16, wherein if the on-DASD sync page contains the initial rogue update, the module is configured to determine whether the index records affected by the rogue updates are all resident in local cache of the detecting system, and if resident to clear the sync page and then enter the error record into the in-core sync page and surface the error message indicating that the PDSE is repairable and has been repaired, wherein the module synchronizes the index records by replacing the affected index records on DASD with the index records in local cache of the detecting system and having all systems in the sysplex re-read the index records from DASD.

20. The computer network of claim 16, wherein if the on-DASD sync page contains the initial rogue update, the module is configured to determine whether the index records affected by the rogue updates are all resident in local cache of the detecting system, and if not resident and no connections for output to the PDSE dataset to enter the error record into the in-core sync page and surface the error message indicating that the PDSE is tolerable, wherein the module synchronizes the index records by rereading the index records from DASD.

* * * * *